(12) United States Patent
Taylor

(10) Patent No.: US 7,646,383 B1
(45) Date of Patent: Jan. 12, 2010

(54) METHODS AND APPARATUSES TO EFFECT DEFORMATION OF COMPUTER-GENERATED THREE-DIMENSIONAL SURFACES

(75) Inventor: Philip Taylor, Wellington (NZ)

(73) Assignee: Autodesk, Inc., San Rafael, CA (US)

( * ) Notice: Subject to any disclaimer, the term of this patent is extended or adjusted under 35 U.S.C. 154(b) by 143 days.

(21) Appl. No.: 10/970,402

(22) Filed: Oct. 20, 2004

Related U.S. Application Data

(60) Provisional application No. 60/575,154, filed on May 28, 2004.

(51) Int. Cl.
*G06T 17/00* (2006.01)
(52) U.S. Cl. .................................. 345/420; 345/473
(58) Field of Classification Search .............. 345/420, 345/643, 644, 645, 646, 647, 648, 441, 442, 345/443, 468, 469, 473
See application file for complete search history.

(56) References Cited

U.S. PATENT DOCUMENTS 6,486,882 B1 * 11/2002 Wolverton et al. .......... 345/475

2004/0095352 A1 * 5/2004 Huang ..................... 345/473

OTHER PUBLICATIONS

Wilhelms et al., "Anatomically Based Modeling", 1997, ACM SIGGRAPH Conference Proceedings, pp. 173-180.*
Watt et al., "Advanced Animation and Rendering Techniques Theory and Practice", 1992, ACM Press, pp. 65-110.*

* cited by examiner

*Primary Examiner*—Kee M Tung
*Assistant Examiner*—Michelle K Lay
(74) *Attorney, Agent, or Firm*—Patterson & Sheridan, LLP

(57) ABSTRACT

Embodiments of the invention provide methods and systems to deform a computer-generated three-dimensional surface using a lattice of rigid bone segments driven by an interpolation algorithm to define a muscle. Such embodiments allow a realistic presentation of subdermal muscle mass. In one embodiment, each end of a curve, created by an interpolation function, is attached to a corresponding bone. One or more muscle segments are attached along the curve. The curve along with the attached muscle segments defines a muscle. As the bones move and rotate the curve is expanded or contracted due to the endpoints of the curve being fixed to distinct bones. The attached muscle segments will experience corresponding expansion and contraction thus providing a realistic presentation of skin deformation. For one embodiment, the position of each muscle segment is determined in reference to a standard Bezier interpolation function.

33 Claims, 9 Drawing Sheets

METHODS AND APPARATUSES TO EFFECT DEFORMATION OF COMPUTER-GENERATED THREE-DIMENSIONAL SURFACES

CLAIM OF PRIORITY

This application is related to, and hereby claims the benefit of provisional application No. 60/575,154, entitled "CAT-Muscle," which was filed on May 28, 2004.

FIELD

Embodiments of the invention relate generally to the field of the presentation of computer generated three-dimensional objects and more specifically to the deformation of computer-generated three-dimensional surfaces.

BACKGROUND

A prevalent conventional technique for presenting three-dimensional surfaces is to approximate the surface with polygons. For this technique a polygon mesh (mesh) is created comprised of a number of polygons connected by vertices. The vertices connecting each polygon of the mesh define the presentation of the polygon (i.e., the vertices define the polygon's shape and location). The surfaces of some objects, for example, computer-generated animated characters (characters), are not rigid. To effect the movement of a character, a mesh is laid over the character and the configuration of the mesh is changed, over time, to represent the movement of the character.

Typically the surface of the character is underlaid with bones, which are objects used to represent the skeletal structure of the character. A skinning algorithm is used to determine and control the deformation of the mesh based upon the movements of the bones. The skinning algorithm is responsible for calculating new positions for the vertices of the mesh for each frame of an animation. A surface that is deformed through use of a skinning algorithm is referred to as a skin.

Two typical skinning techniques are muscle simulation and bone matrices.

Muscle simulation effects deformation of skin meshes by accurately defining and modelling the skeletal structure of a character. Each bone is then replicated in detail and each muscle is modelled and attached to the appropriate bones. The skin of the character is then calculated to slide over the top of the bones and muscles. Movement and rotation of the bones causes stretching and compression of the attached muscles.

The muscle simulation technique has distinct disadvantages for many applications. For example, because the skeletal and muscular structure of the character is modelled in detail, an extensive knowledge of the character's anatomy is required. This is especially true if the physical properties of the muscles are also simulated to create secondary movement such as wobble and jiggle. Moreover, such modelling requires a great deal of set-up time and resources. That is, because collisions between the bones and muscles must be calculated, when many muscles are involved (for example, for a human character), the process requires a tremendous amount of computational resources.

Due to these limitations, muscle simulation is typically used in applications where time, costs, and computational resources are not restrictive (e.g., motion pictures). For other applications in which time, costs, and computational resources are relatively scarcer, including real-time applications such as computer games, skin deformation is effected using a bone matrix skinning technique. Bone matrix skinning (BMS) is a skinning technique in which the skin is deformed based upon transformation matrices (TMs) of the bones.

BMS uses bones to represent the skeletal structure of the character. For the purposes of this document, the term 'bone' refers to the object that drives the skinning solution. Thus, the term 'bone' does not describe the appearance of an object, but rather, its application.

The TM of a bone is used by the skinning algorithm to drive the deformation of the skin. TMs can be used to represent the position, rotation, and scaling of computer-generated three-dimensional objects or characters. TMs provide an efficient method for computers to handle hierarchies of objects. TMs can be scaled non-uniformly and distorted allowing the represented object to be squashed, stretched and skewed, thus presenting the deformation of the object's skin caused by the TM.

Typical BMS techniques use hierarchies of bones that define a skeleton. Each bone's TM is used by the skin system to move the vertices of the polygonal mesh around. As the bone moves around, the movement is transferred, via the TM, onto vertices that make up the skin of the character. This allows the use of a few bone objects to move many vertices.

FIGS. 1A and 1B illustrate the deformation of a character's skin through the use of a bone TM to control the movement of the vertices of a mesh comprising the skin in accordance with the prior art. Mesh 100, shown in FIG. 1A is comprised of six vertices a, b, c, d, ab, and cd, which are connected by four polygons, A, B, C, and D forming the mesh. Each vertex may be attached to one or more bones that influence the vertex. For example, as shown in FIG. 1A, vertices a and ab are attached to bone 105, vertices d and cd are attached to bone 110, and vertices c and b are each attached to both bone 105 and bone 110. FIG. 1B illustrates the rotation of bones 105 and 110 about a pivot point 115. As shown in FIG. 1B, if a vertex (e.g., vertices a and ab) is attached to one bone (i.e., bone 105), the vertex will move with the bone. For example, as bone 105 rotates about pivot point 115, vertices a and ab move in a simple circular arc around pivot point 115 also. As shown in FIG. 1B, as the bone is stretched or skewed, the attached vertices will be stretched and skewed in the same manner.

For typical applications, there will be many areas of a mesh in which multiple bones influence the same vertex. Such areas include, for example, the knee, shoulder, and elbow of a human character. As illustrated in FIGS. 1A and 1B, vertices c and d are each influenced by bones 105 and 110. In such cases, the vertices are influenced by a weighting (e.g., average) of the positions and orientations of each of the multiple bones. That is, the position of each vertex is the result of multiple bone TMs.

BMS techniques are relatively simple, fast, and computationally inexpensive, and are therefore widely used in many areas of three-dimensional animation. However, such methods are not without drawbacks. For example, when BMS techniques are applied to areas of a mesh where a large amount of deformation is required such as areas requiring a wide range of movement, the movements are impossible to simulate with typical skinning techniques. For example, the shoulder of a human character has a wide range of movement and yet simulation of movements easily performed by a real shoulder are problematic or impossible using a conventional BMS technique. Moreover, such techniques employ a rigid hierarchical movement of bones that is useful in defining the bone structure of a character, but limit skin movement about the bone joints and do not produce a realistic presentation of skin deformation in circumstances in which the shape of a character's skin is better defined by sub-surface fat and muscle. That is, typical techniques present a character as a bone covered with skin and have limited ability to depict the accompanying muscle movement.

FIG. 2 illustrates the unrealistic distortion inherent in conventional BMS techniques in accordance with the prior art. As shown in FIG. 2, mesh 201 is influenced by rectangular boxes (bones) 205 and 210. As deformation is effected, the area of the mesh 201 corresponding to the pivot point 215 of bones 205 and 210 is irregularly distorted resulting in an unrealistic deformation of the mesh 201. Presentation of such deformation is that of a bone covered with skin, lacking the appearance of the underlying muscle.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Figure 1A:
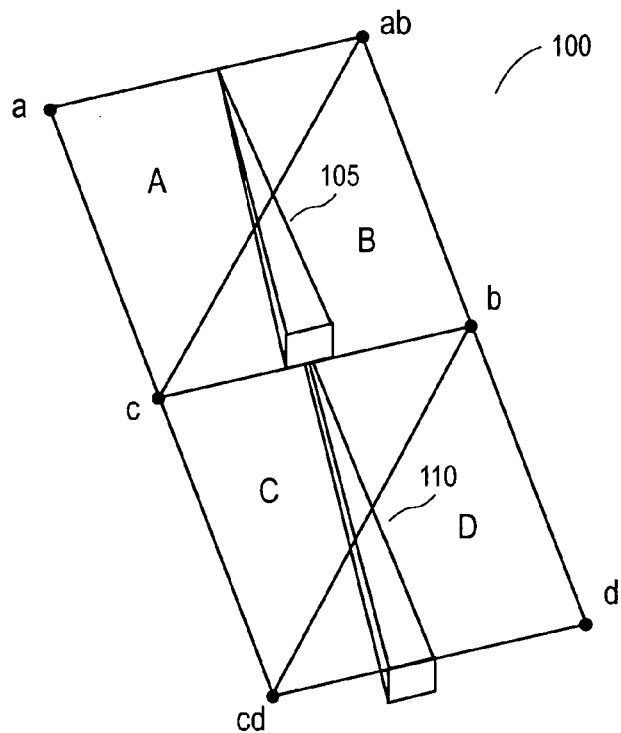
FIGS. 1A and 1B illustrate the deformation of a character's skin through the use of a bone TM to control the movement of the vertices of a mesh comprising the skin in accordance with the prior art.
Figure 1B:
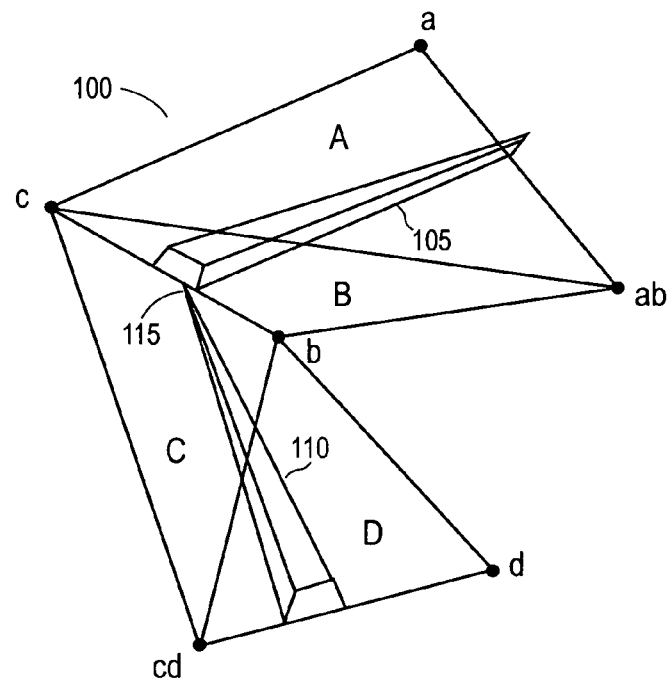
Figure 2:
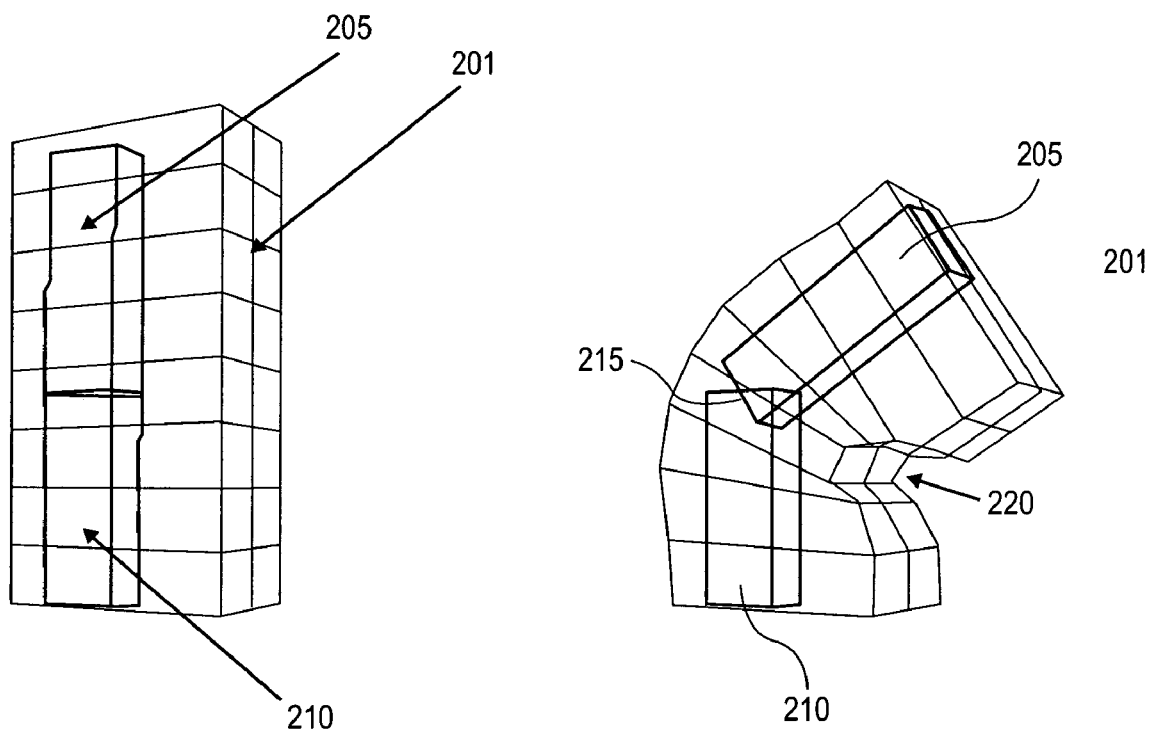
FIG. 2 illustrates the unrealistic distortion inherent in conventional BMS techniques in accordance with the prior art.

Embodiments of the invention provide methods and systems to deform a computer-generated three-dimensional surface using a lattice of rigid bone segments driven by an interpolation algorithm to define a muscle. Such embodiments allow a realistic presentation of subdermal muscle mass. For one embodiment of the invention, the position of each muscle segment is determined in reference to a standard Bezier interpolation function. Embodiments of the invention provide fast, efficient, and realistic presentation of surface deformation without complex modelling (e.g., anatomical modelling).

Embodiments of the invention incorporate a smooth interpolation into a conventional BMS technique so that the movement of the skin is not limited to simple circular arcs, about the bone joints. One such embodiment includes bone segment chains that are driven by Bezier splines to produce a hierarchy of bones that can be quickly and efficiently processed by conventional software applications to effect skin deformation.

In accordance with one embodiment of the invention, each end of a curve, created by an interpolation function, is attached to a corresponding bone. One or more muscle segments are attached along the curve. The curve along with the attached muscle segments defines a muscle. As the bones move and rotate the curve is expanded (stretched) or contracted (squashed) due to the endpoints of the curve being fixed to distinct bones. The attached muscle segments will experience corresponding stretching and squashing thus providing a realistic presentation of skin deformation.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Bezier Interpolation

Embodiments of the invention will be described in reference to a Bezier interpolation, however it will be apparent to those skilled in the art that numerous and varied interpolation functions could be employed in accordance with alternative embodiments of the invention.

Figure 3:
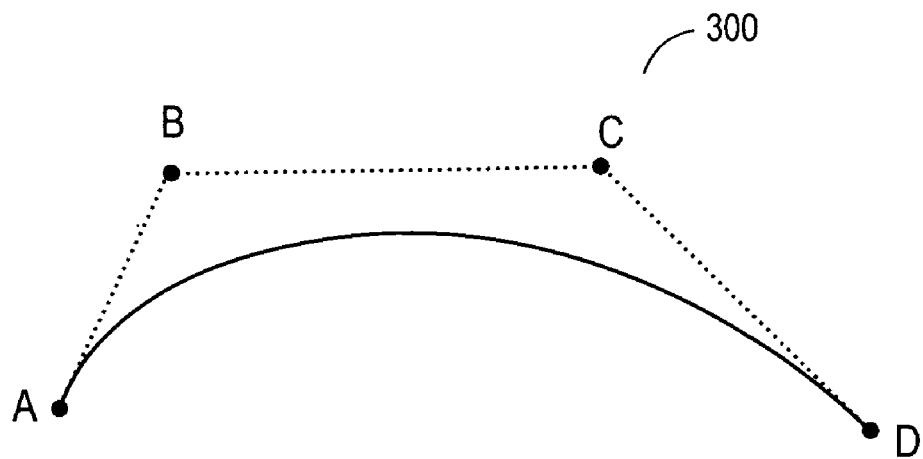
FIG. 3 illustrates construction of a Bezier spline in accordance with the prior art, for use in an embodiment of the invention.

Bezier interpolation is a known method for constructing lines in a plane or in three-dimensional space. A smooth curve is derived from a few control points. Typically four points define a section of the curve; two of the points define the start and end positions of the curve, and the other two points define the direction in which the curve begins and ends. FIG. 3 illustrates construction of a Bezier spline (curve) in accordance with the prior art, for use in an embodiment of the invention. As shown in FIG. 3, curve 300 begins at point A and ends at point D. In general, curve 300 will not pass through points B and C, which serve to provide directional information. That is, curve 300 starts at point A in the direction of point B, and ends at point D in the direction of point C, with the distance between point A and point B determining the extent to which curve 300 continues in the direction of point B before altering direction toward point D.

For one embodiment of the invention, each muscle is made up of one or more strands, with each strand driven by a corresponding smoothly interpolated curve. Each curve may be divided into a plurality of segments each of which is defined by a standard bone. The bone segments are calculated to stretch and squash according to the movement of the Bezier curve. As the start point and end point of the curve move, the muscle segment attached to the bone segment will stretch and squash, but will always remain on the curve between the start point and the end point of the curve. For one embodiment each bone segment may be represented by a single rectangular hexahedron.

For one embodiment of the invention, the position of each segment along the curve is derived from a standard Bezier interpolation function:

$$B(u) = \sum_{k=0}^{N} Pk \frac{N!}{k!(N-k)!} u^k (1-u)^{N-k} \text{ for } 0 \leq u \leq 1$$

Figure 4:
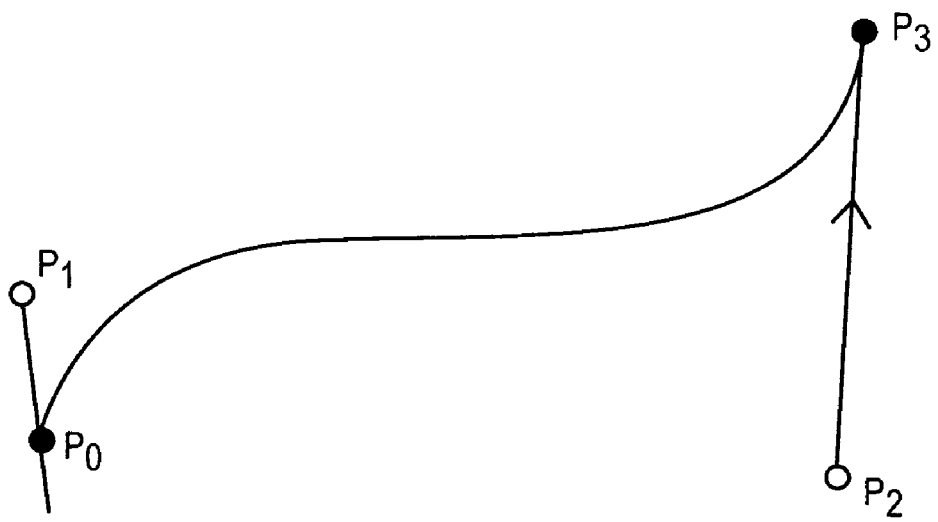
FIG. 4 illustrates a Bezier curve in accordance with one embodiment of the invention.

As illustrated in FIG. 4, values p0-p3 define a start position (p0), a start tangent (p1), an end position (p2), and an end tangent (p3), of a Bezier curve in accordance with one embodiment of the invention. For the values p0-p3, the positions of four objects in the three-dimensional application are used. These objects can be manipulated to change the shape of the muscle. Attaching these objects to bones in a skeleton provides deformation of the muscle upon movement of the skeleton.

The U parameter of the Bezier interpolation function defines the position along the length curve. The value of U can vary between 0 and 1 with U=0 indicating the start position of the curve and U=1 indicating the end position of the curve. Each muscle segment is assigned a U-value on the curve that defines its positional ratio along the curve (i.e., the position of the muscle segment relative to the defined curve). For one embodiment of the invention, each of a plurality of muscle segments are evenly spaced along the curve with U values evenly incrementing from 0 for the beginning of the first segment to 1 for the end of the last segment. For example, if four muscle segments are attached to the curve, they will be attached at U=0, 0.25, 0.5, and 0.75, respectively.

Transformation Matrix Generation

Figure 5:
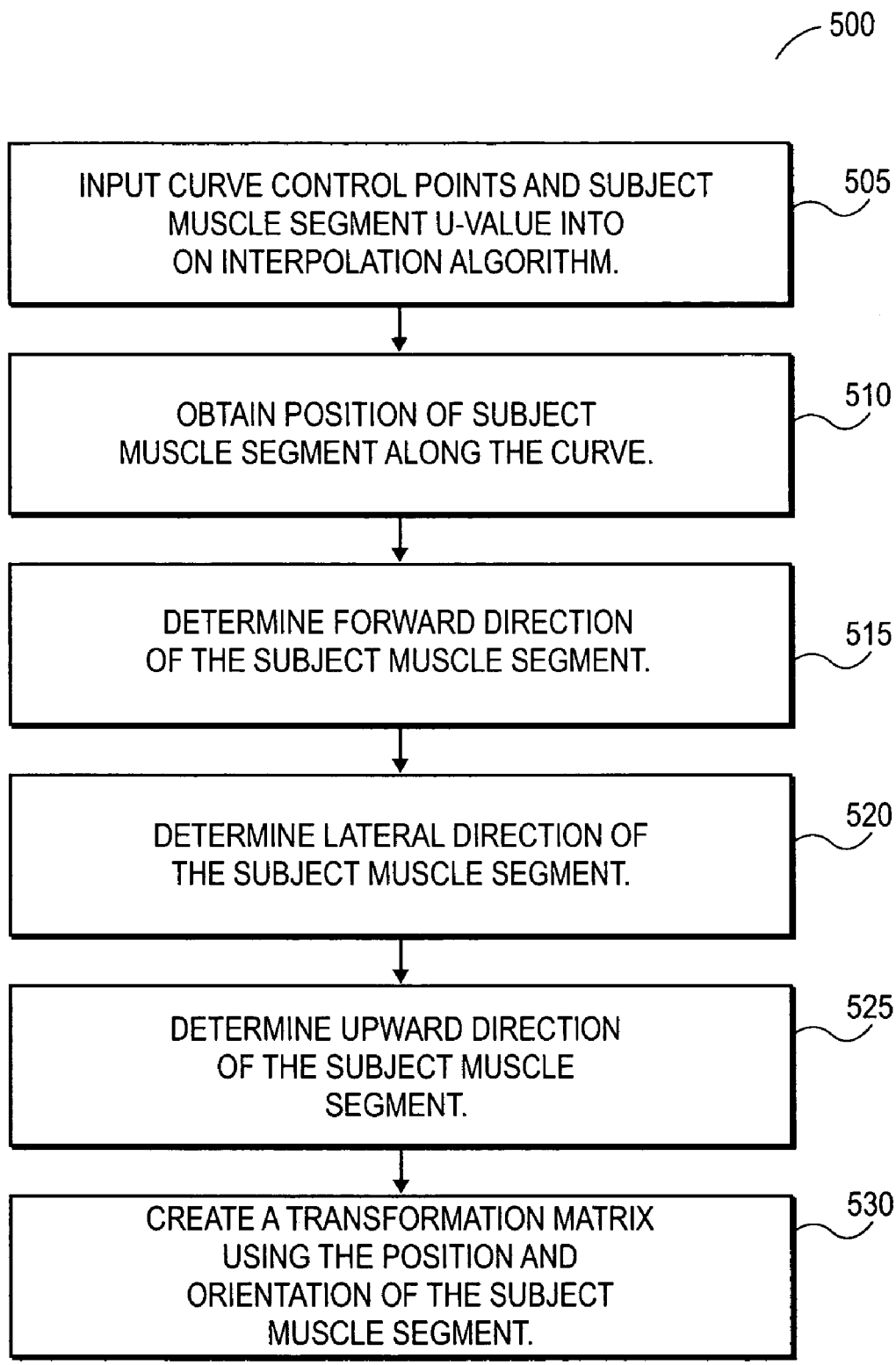
FIG. 5 illustrates a process by which a TM is generated for each muscle segment in accordance with one embodiment of the invention.

FIG. 5 illustrates a process by which a TM is generated for each muscle segment in accordance with one embodiment of the invention. Process 500, shown in FIG. 5, begins at operation 505 in which control points of a curve and a segment U-value of a subject muscle segment (i.e., the muscle segment for which a TM is being created) are input into an interpolation algorithm.

At operation 510 the interpolation algorithm outputs the position of the subject muscle segment along the curve.

Figure 6:
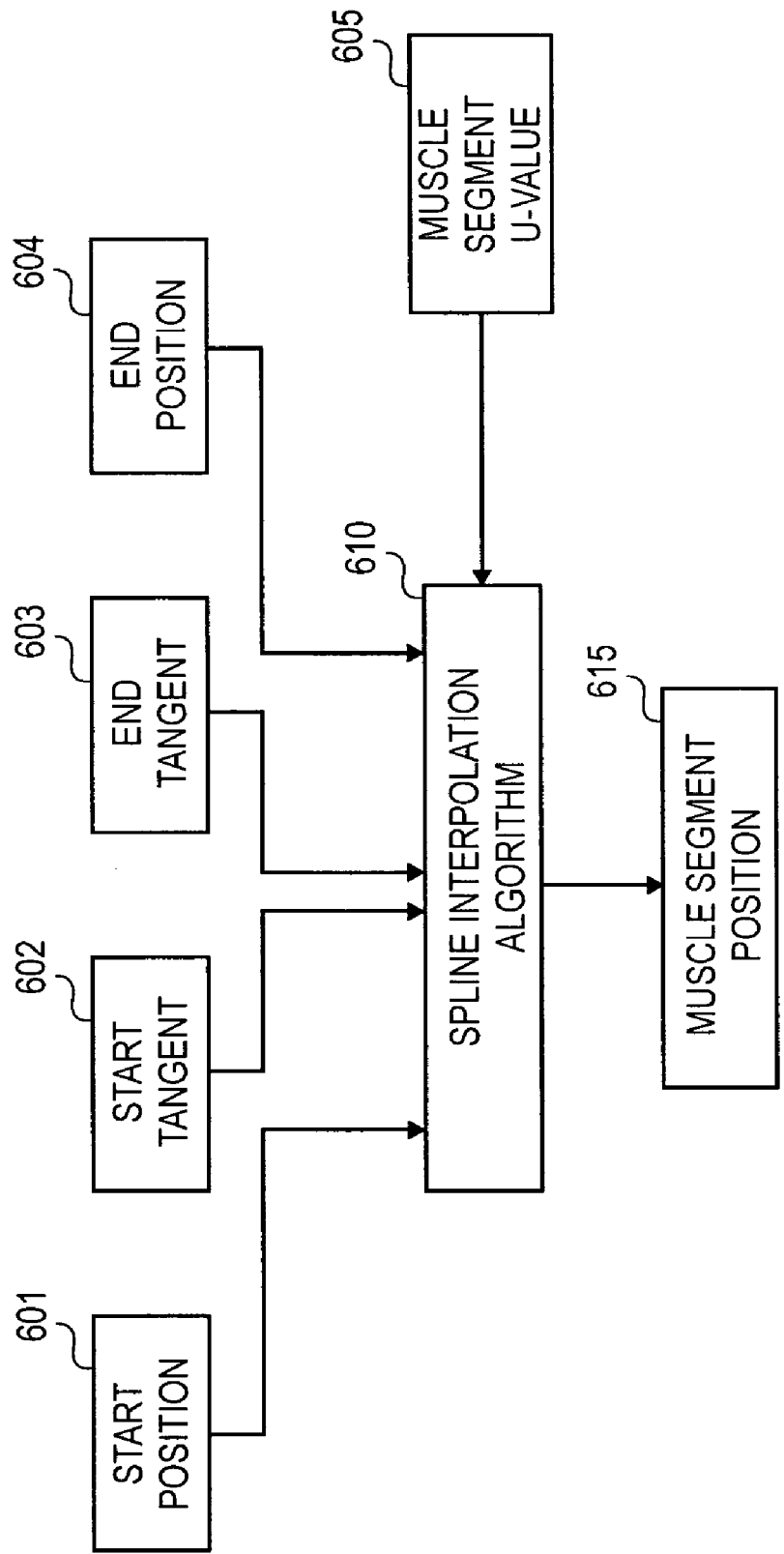
FIG. 6 illustrates the determination of a muscle segment position in accordance with an embodiment of the invention employing a spline interpolation function.

FIG. 6 illustrates the determination of a muscle segment position in accordance with an embodiment of the invention employing a spline interpolation function. As shown in FIG. 6, start position 601, start tangent 602, end tangent 603, end position 604, and the U-value of a muscle segment 605 are input into a spline interpolation algorithm 610. The output of the spline interpolation algorithm is the muscle segment position along the curve 615.

The process of generating a TM for a muscle segment continues with determination of the subject muscle segment orientation. That is, after determining the subject muscle segment position, the subject muscle segment orientation is determined to generate the complete TM for the muscle segment. In accordance with one embodiment of the invention, the overall muscle is comprised of muscle strands that contain one or more muscle segments. The strands are grouped, providing a lattice of muscle segments with each segment having neighboring segments in front and to the left and right. In accordance with one embodiment of the invention the positions of these neighboring segments are used to determine the orientation of the subject muscle segment.

Figure 7:
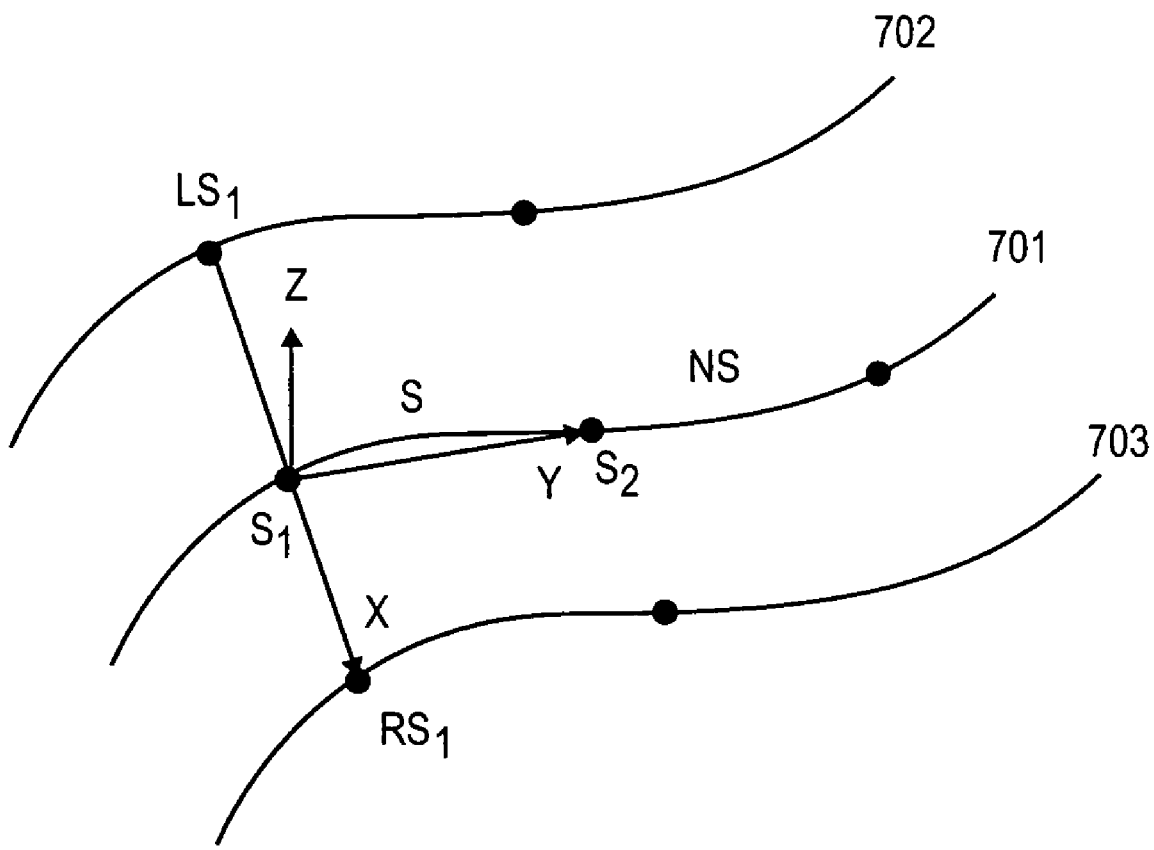
FIG. 7 illustrates the relationship of neighboring muscle segments in accordance with one embodiment of the invention.

Referring again to FIG. 5, at operation 515 the forward direction of the subject muscle segment is determined. In accordance with one embodiment of the invention, the forward direction of the subject muscle segment is determined by reference to the next segment along the curve. FIG. 7 illustrates the relationship of neighboring muscle segments in accordance with one embodiment of the invention. As shown in FIG. 7, a muscle segment S is positioned at point s1 along curve 701. The next segment NS along curve 701 is positioned at point s2. Vector Y, pointing from the position of segment S (i.e., point s1) to the position of the next segment NS (i.e., point s2), determines the forward direction of muscle segment S.

Referring again to FIG. 5, at operation 520 the lateral direction of the subject muscle segment is determined. In accordance with one embodiment of the invention, the lateral direction of the subject muscle segment is determined by reference to muscle segments on adjacent muscle strands to the right-hand side and left-hand side of the subject muscle segment. Referring again to FIG. 7, ls1 represents the position of a muscle segment along curve 702 adjacent to muscle segment S on the left-hand side and rs1 represents the position of a muscle segment along curve 703 adjacent to muscle segment S on the right-hand side. Vector X, pointing from the adjacent muscle segment positioned at point ls1, through the position of segment S (i.e., point s1) to the position of the adjacent muscle segment positioned at point rs1, determines the lateral direction of muscle segment S.

Referring again to FIG. 5, at operation 525 the upward direction of the subject muscle segment is determined. In accordance with one embodiment of the invention, the upward direction of the subject muscle segment is determined by reference to the forward direction of the subject muscle segment and the lateral direction of the subject muscle segment. For one such embodiment, the upward direction is perpendicular to both the forward direction and the lateral direction. Referring again to FIG. 7, the upward direction of muscle segment S is determined by vector Z, perpendicular to vector X and vector Y (i.e., vector Z represents the cross product of vector X and vector Y).

Referring again to FIG. 5, at operation 530 a TM for the subject muscle segment is created from the position and orientation of the subject muscle segment.

Figure 8:
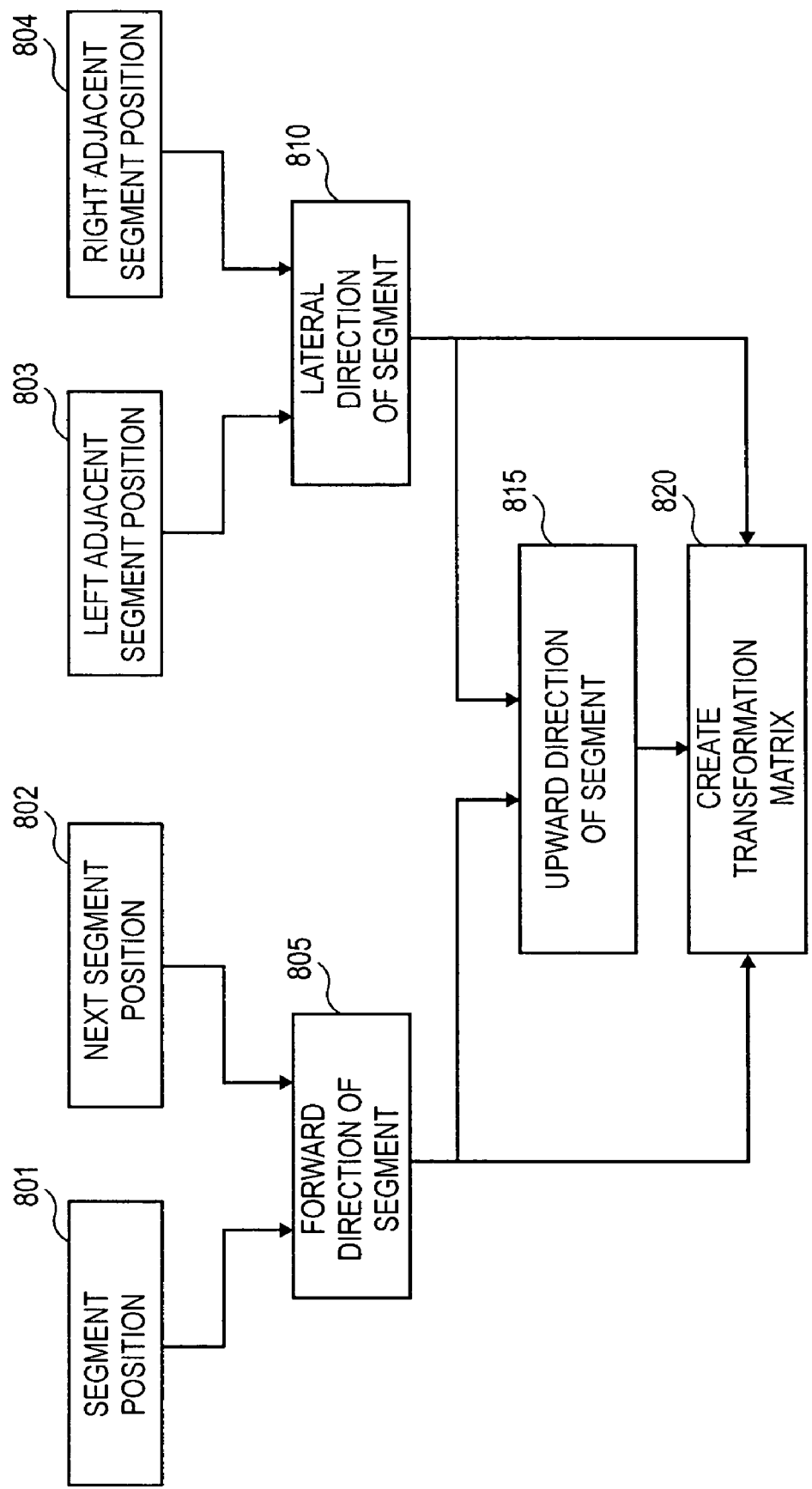
FIG. 8 illustrates the creation of a TM for a muscle segment using the positional and orientation information of the muscle segment and neighboring muscle segments.

FIG. 8 illustrates the creation of a TM for a muscle segment using the positional and orientation information of the muscle segment and neighboring muscle segments. As shown in FIG. 8, the position of the subject segment 801 and the position of the next segment along the same curve 802 are used to determine the forward direction 805 of the subject segment. The position of the left adjacent segment 803 and the position of the right adjacent segment 804 are used to determine the lateral direction 810 of the subject segment. The forward direction 805 of the subject segment and the lateral direction 810 of the subject segment are used to determine the upward direction 815 of the subject segment. Finally, the forward direction 805 of the subject segment, the lateral direction 810 of the subject segment, and the upward direction 815 of the subject segment are used to create the TM of the subject segment. Exemplary code for effecting the creation of a TM in accordance with one embodiment of the invention is included as Appendix A.

The resulting TM can be used with conventional skinning techniques to deform vertices in the skin driven by the subject muscle segment. The vectors of the TM indicate the direction of the subject muscle segment as well as the extent the subject muscle segment is expanded or contracted. That is, the direction of the vector for each direction of orientation indicates the direction of the subject muscle segment, and the length of each vector indicates the expansion or contraction of the subject muscle segment in that direction. Each muscles segment expands and contracts in accordance with the spline on which it is positioned. As the muscle expands and contracts, the attached skin expands and contracts correspondingly. Because the movement of the muscle segments is defined by a smooth curve (e.g., a Bezier spline), the muscle segments move smoothly providing realistic skin deformation.

For one embodiment of the invention, the skin is attached to the bones through conventional skinning methods allowing such embodiments to be compatible with typical conventional bone deformation software and hardware.

Scaleability

Embodiments of the invention provide an increased degree of scaleability as the number of muscle strands and muscle segments per strand can be varied depending upon the application. This allows a complex set-up with many strands and segments to be implemented where required (e.g., circumstances in which a large amount of deformation is required such as areas requiring a wide range of movement) or a more simplistic set-up that can be configured quickly, if necessary, for real-time applications (e.g., games).

Figure 9:
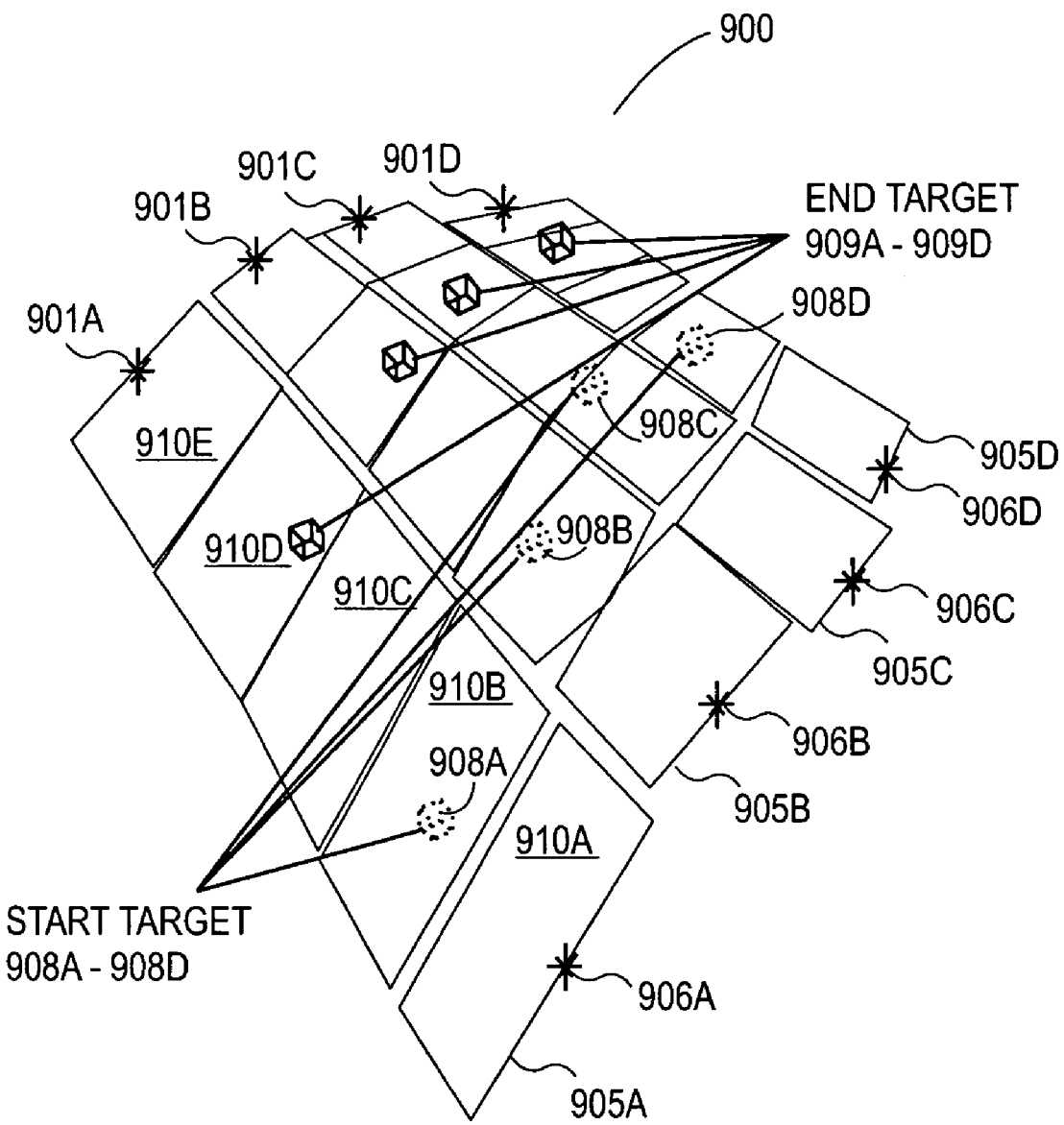
FIG. 9 illustrates the representation of a muscle for an animated character in accordance with one embodiment of the invention.

FIG. 9 illustrates the representation of a muscle for an animated character in accordance with one embodiment of the invention. Muscle 900, shown in FIG. 9, is made up of four muscle strands 905a-905d. Each muscle strand 905a-905d has five muscle segments 910a-910e. Each muscle segment is positioned along a corresponding spline (not shown) that is used to drive the muscle segments, with a corresponding start point 906a-906d, corresponding end point 907a-907d, corresponding start tangent 908a-908d, and corresponding end tangent 909a-909d.

Figure 10:
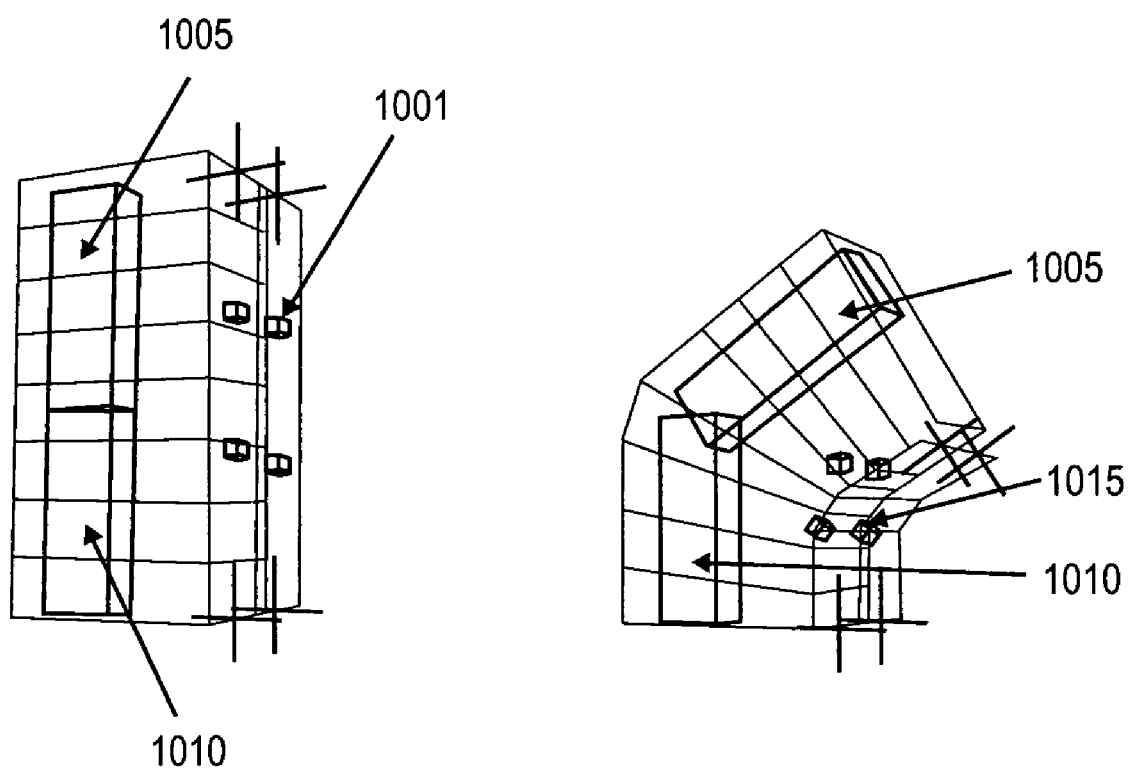
FIG. 10 illustrates skin deformation in accordance with one embodiment of the invention.

FIG. 10 illustrates skin deformation in accordance with one embodiment of the invention. As shown in FIG. 10, mesh 1001 is influenced by bones 1005 and 1010. Bones 1005 and 1010 have muscles segments attached to them in accordance with one embodiment of the invention. The muscle start and end points are attached to the bones. The attached muscles segments follow the rotation of bone 1005 causing the muscle to bend smoothly. The smooth and natural-looking movement of the muscle segments drives the skin deformation. As deformation is effected, the area of the mesh 1001 corresponding to the pivot point 1015 of bones 1005 and 1010 is deformed in a smooth and continuous manner, and its volume is preserved, resulting in a more realistic deformation of the mesh 1001 than is provided with conventional skin deformation techniques. Embodiments of the invention produce a realistic presentation of skin deformation in circumstances in which the shape of a character's skin is better defined by sub-surface fat and muscle.

General Matters

Embodiments of the invention provide methods and systems to deform a computer-generated three-dimensional surface using a lattice of rigid bone segments driven by an interpolation algorithm to define a muscle. Such embodiments allow a realistic presentation of subdermal muscle mass. In one embodiment, each end of a curve, created by an interpolation function, is attached to a corresponding bone. One or more muscle segments are attached along the curve. The curve along with the attached muscle segments defines a muscle. As the bones move and rotate the curve is expanded or contracted due to the endpoints of the curve being fixed to distinct bones. The attached muscle segments will experience corresponding expansion and contraction thus providing a realistic presentation of skin deformation. For one embodiment, the position of each muscle segment is determined in reference to a standard Bezier interpolation function.

For example, although embodiment of the invention have been described in application to polygonal meshes, alternative embodiments are equally applicable to any other surface representation method.

Embodiments of the invention have been described as a process having various operations. Such operations are exemplary and may be described in their most basic form, but operations can be added to or deleted from the process without departing from the basic scope of the invention in accordance with various embodiments. For example, process 500, described above in reference to FIG. 5, may effect the creation of a TM for a muscle segment with only a partial determination of the muscle segment orientation.

In the above description, numerous details are set forth, however, it will be apparent to one skilled in the art, that the present invention may be practiced without these specific details. In other instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

APPENDIX A

Exemplary code for creating a transformation matrix for a muscle segment:

//forward ydir=nextpos-thispos;

//sideways xdir=(leftpos-rightpos)/2.0f;

//Up zdir=Normalize(CrossProd(xdir, ydir));

tm.SegTrans.SetTrans(thispos);

tmSegTrans.SetRow(0, xdir);

tmSegTrans.SetRow(1, ydir);

tmSegTrans.SetRow(2, zdir);

[tmSegTrans is the resulting transformation matrix.]

What is claimed is:

1. A computer-implemented method comprising:
    defining a muscle as a non-cylindrical aggregation of one or more curves, wherein each curve comprises a start point attached to a first bone segment and an end point attached to a second bone segment and is further subdivided into a set of muscle segments;
    determining a muscle segment position and muscle segment orientation for each of the muscle segments by applying an interpolation algorithm to the curve corresponding to the muscle segment; and
    generating a transformation matrix for a skinning operation for attaching a skin mesh to the muscle based on the muscle segment position and muscle segment orientation corresponding to each of the muscle segments.

2. The computer-implemented method of claim 1, further comprising receiving an input from a user for modifying the curve, and regenerating the transformation matrices using the modified curve.

3. The method of claim 1, wherein each of the one or more curves is a spline.

4. The method of claim 3 wherein movement of the first bone segment or the second bone segment causes corresponding movement of the muscle and deformation of the skin mesh.

5. The method of claim 4 wherein the interpolation algorithm is a spline interpolation algorithm.

6. The method of claim 5 wherein the spline is a spline selected from the group consisting of a cubic spline, a Bezier spline, and a NURB spline.

7. The method of claim 5 wherein determining the position of the muscle segment along the spline includes determining a spline ratio value for each muscle segment, the spline ratio value indicating the relative position of the muscle segment along the spline, and inputting the spline ratio value and a set of spline control points into the spline interpolation algorithm.

8. The method of claim 7 wherein determining muscle segment orientation includes determining at least one of a forward direction of a muscle segment, a lateral direction of the muscle segment, and an upward direction of the muscle segment.

9. The method of claim 8 wherein determining muscle segment orientation includes determining a forward direction of the muscle segment based upon the determined position of the muscle segment and the position of a subsequent segment along the spline.

10. The method of claim 8 wherein determining muscle segment orientation includes determining a lateral direction of the muscle segment based upon the determined position of one or more lateral muscle segments positioned laterally adjacent relative to the muscle segment.

11. The method of claim 7 wherein determining muscle segment orientation includes determining a forward direction of a muscle segment, a lateral direction of the muscle segment, and an upward direction of the muscle segment, the upward direction of the muscle segment determined as a cross-product of the forward direction of the muscle segment and the lateral direction of the muscle segment.

12. A computer-readable storage medium having stored thereon a set of instructions which when executed cause a system to perform a method comprising:
    defining a muscle as a non-cylindrical aggregation of one or more curves, wherein each curve comprises a start point attached to a first bone segment and an end point attached to a second bone segment and is further subdivided into a set of muscle segments;
    determining a muscle segment position and muscle segment orientation for each of the muscle segments by applying an interpolation algorithm to the curve corresponding to the muscle segment; and
    generating a transformation matrix for a skinning operation for attaching a skin mesh to the muscle based on the muscle segment position and muscle segment orientation corresponding to each of the muscle segments.

13. The computer-readable storage medium of claim 12 further comprising receiving an input from a user for modifying the curve, and regenerating the transformation matrices using the modified curve.

14. The computer-readable medium of claim 12, wherein each of the one or more curves is a spline.

15. The computer-readable storage medium of claim 14 wherein movement of the first bone segment or the second bone segment causes corresponding movement of the muscle and deformation of the skin mesh.

16. The computer-readable storage medium of claim 15 wherein the interpolation algorithm is a spline interpolation algorithm.

17. The computer-readable storage medium of claim 16 wherein the spline is a spline selected from the group consisting of a cubic spline, a Bezier spline, and a NURB spline.

18. The computer-readable storage medium of claim 16 wherein determining the position of the muscle segment along the spline includes determining a spline ratio value for each muscle segment, the spline ratio value indicating the relative position of the muscle segment along the spline, and inputting the spline ratio value and a set of spline control points into the spline interpolation algorithm.

19. The computer-readable storage medium of claim 18 wherein determining muscle segment orientation includes determining at least one of a forward direction of a muscle segment, a lateral direction of the muscle segment, and an upward direction of the muscle segment.

20. The computer-readable storage medium of claim 19 wherein determining muscle segment orientation includes determining a forward direction of the muscle segment based upon the determined position of the muscle segment and the position of a subsequent segment along the spline.

21. The computer-readable storage medium of claim 19 wherein determining muscle segment orientation includes determining a lateral direction of the muscle segment based upon the determined position of one or more lateral muscle segments positioned laterally adjacent relative to the muscle segment.

22. The computer-readable storage medium of claim 18 wherein determining muscle segment orientation includes determining a forward direction of a muscle segment, a lateral direction of the muscle segment, and an upward direction of the muscle segment, the upward direction of the muscle segment determined as a cross-product of the forward direction of the muscle segment and the lateral direction of the muscle segment.

23. A system comprising:
a processor; and
a memory, coupled to the processor, having stored thereon a set of instructions which when executed cause the processor to perform a method comprising:
defining a muscle as a non-cylindrical aggregation of one or more curves, wherein each curve comprises a start point attached to a first bone segment and an end point attached to a second bone segment and is further subdivided into a set of muscle segments;
determining a muscle segment position and muscle segment orientation for each of the muscle segments by applying an interpolation algorithm to the curve corresponding to the muscle segment; and
generating a transformation matrix for a skinning operation for attaching a skin mesh to the muscle based on the muscle segment position and muscle segment orientation corresponding to each of the muscle segments.

24. The system of claim 23 further comprising receiving an input from a user for modifying the curve, and regenerating the transformation matrices using the modified curve.

25. The system of claim 23, wherein each of the one or more curves is a spline.

26. The system of claim 25 wherein movement of the first bone segment or the second bone segment causes corresponding movement of the muscle and deformation of the skin mesh.

27. The system of claim 26 wherein the interpolation algorithm is a spline interpolation algorithm.

28. The system of claim 27 wherein the spline is a spline selected from the group consisting of a cubic spline, a Bezier spline, and a NURB spline.

29. The system of claim 27 wherein determining the position of the muscle segment along the spline includes determining a spline ratio value for each muscle segment, the spline ratio value indicating the relative position of the muscle segment along the spline, and inputting the spline ratio value and a set of spline control points into the spline interpolation algorithm.

30. The system of claim 29 wherein determining muscle segment orientation includes determining at least one of a forward direction of a muscle segment, a lateral direction of the muscle segment, and an upward direction of the muscle segment.

31. The system of claim 30 wherein determining muscle segment orientation includes determining a forward direction of the muscle segment based upon the determined position of the muscle segment and the position of a subsequent segment along the spline.

32. The system of claim 30 wherein determining muscle segment orientation includes determining a lateral direction of the muscle segment based upon the determined position of one or more lateral muscle segments positioned laterally adjacent relative to the muscle segment.

33. The system of claim 29 wherein determining muscle segment orientation includes determining a forward direction of a muscle segment, a lateral direction of the muscle segment, and an upward direction of the muscle segment, the upward direction of the muscle segment determined as a cross-product of the forward direction of the muscle segment and the lateral direction of the muscle segment.

* * * * *